June 4, 1935.  C. MILLER  2,003,754

PHOTOGRAPHIC APPARATUS

Filed Oct. 16, 1934  3 Sheets—Sheet 1

June 4, 1935.  C. MILLER  2,003,754
PHOTOGRAPHIC APPARATUS
Filed Oct. 16, 1934  3 Sheets-Sheet 2
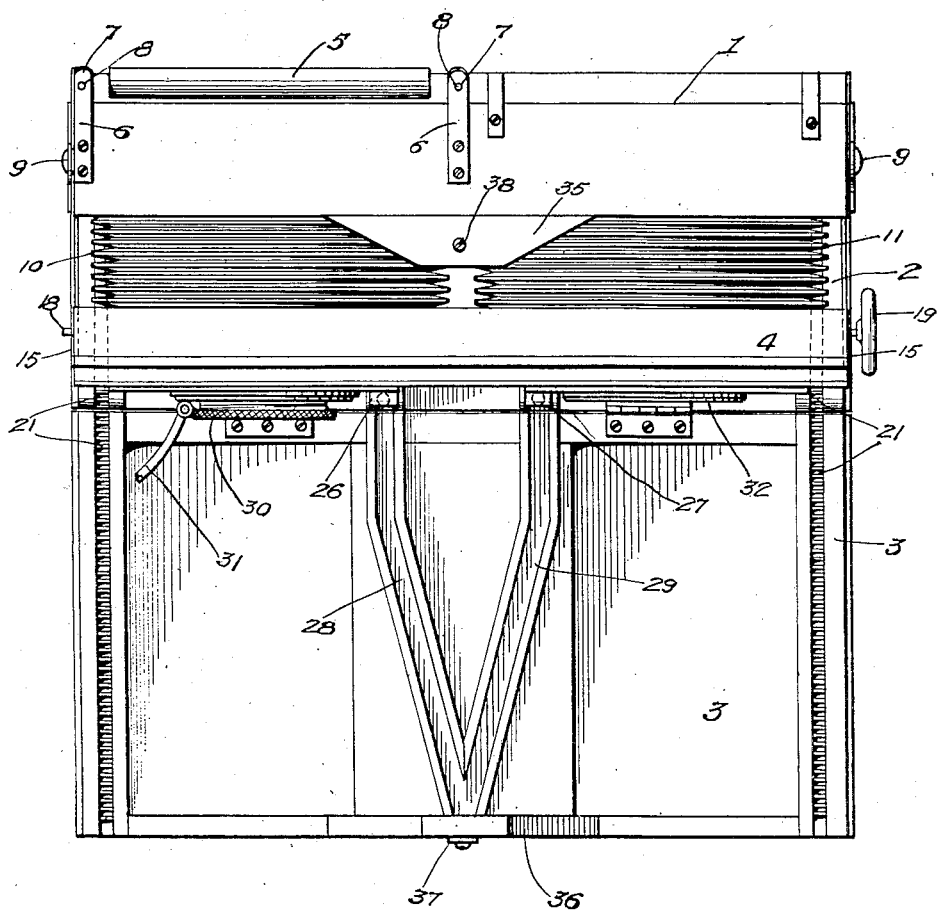

June 4, 1935.                C. MILLER                2,003,754
                         PHOTOGRAPHIC APPARATUS
                         Filed Oct. 16, 1934        3 Sheets-Sheet 3
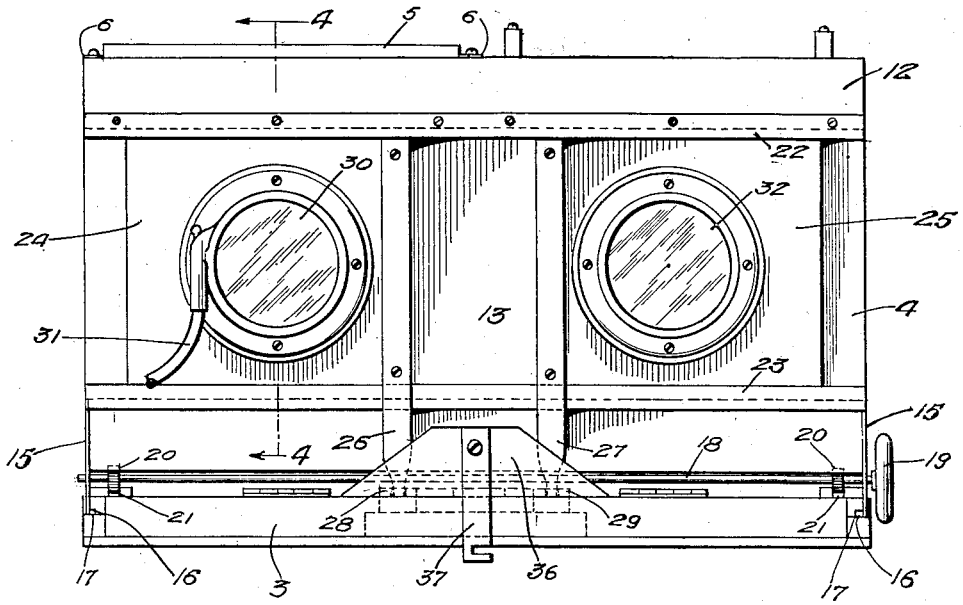
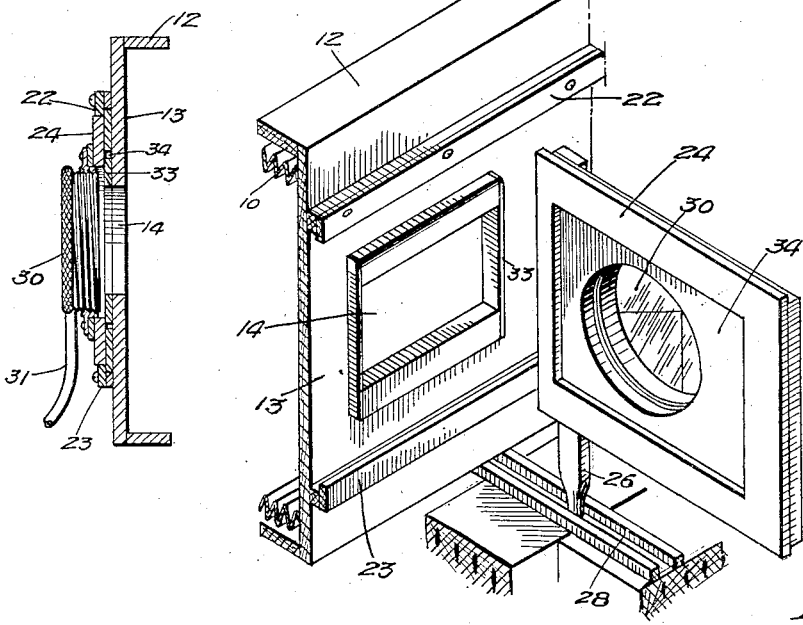

Patented June 4, 1935

2,003,754

UNITED STATES PATENT OFFICE 2,003,754

PHOTOGRAPHIC APPARATUS

Carl Miller, Philadelphia, Pa.

Application October 16, 1934, Serial No. 748,515

8 Claims. (Cl. 95—44)

This invention relates to photographic apparatus and, more particularly, to cameras of the type employing a twin unit construction in which one of the units is adapted to photograph the object, while the other unit is merely a finder unit to enable proper posing of the object and focusing of the camera prior to taking the picture. Such a camera is particularly adapted to the photographing of children as it enables the taking of the picture immediately when the proper pose and focus is obtained and does not require posing and focusing prior to insertion of the photographic plate, as in the use of the ordinary camera, which necessarily involves such time delay after sighting and focusing that the object oftentimes changes position with consequent undesired variation in the picture.

Cameras of the general type here involved which have heretofore been proposed are objectionable in that they are complicated in structure and are, therefore, expensive to manufacture with the result that their high selling price prohibits their use in many instances. Furthermore, they involve a considerable number of moving parts which necessarily detracts from their ease of use and efficiency of operation.

An object of the present invention is, therefore, to provide a camera of simple construction which involves a minimum of moving parts and which, because of its simplicity of construction, may be manufactured at low cost and sold at a price which is not prohibitive of use in any instance.

Another object of the invention is to provide a camera of this type in which the moving parts are so freely movable that sliding elements may be employed and in which the necessity of anti-friction devices, such as rollers, is entirely obviated.

A further object of the invention is to provide a camera of this type in which the only transversely movable elements are the lens plates themselves, these elements being free of attachment to eath other or to the other parts of the apparatus.

A still further object of the invention is to provide in such a camera novel means for preventing light from entering the photographing unit behind the freely movable lens plate thereof.

These various objects are attained by the features of construction illustrated in the preferred embodiment of the device shown on the accompanying drawings to which reference may be had in conjunction with the following detailed description.

In the drawings:

Fig. 2 is a plan view of the device in open position;

Fig. 3 is a front elevational view of the device;

Fig. 4 is a fragmentary sectional view taken along line 4—4 of Fig. 3; and

Fig. 5 is a perspective view illustrating certain features of the invention.

Figure 1:
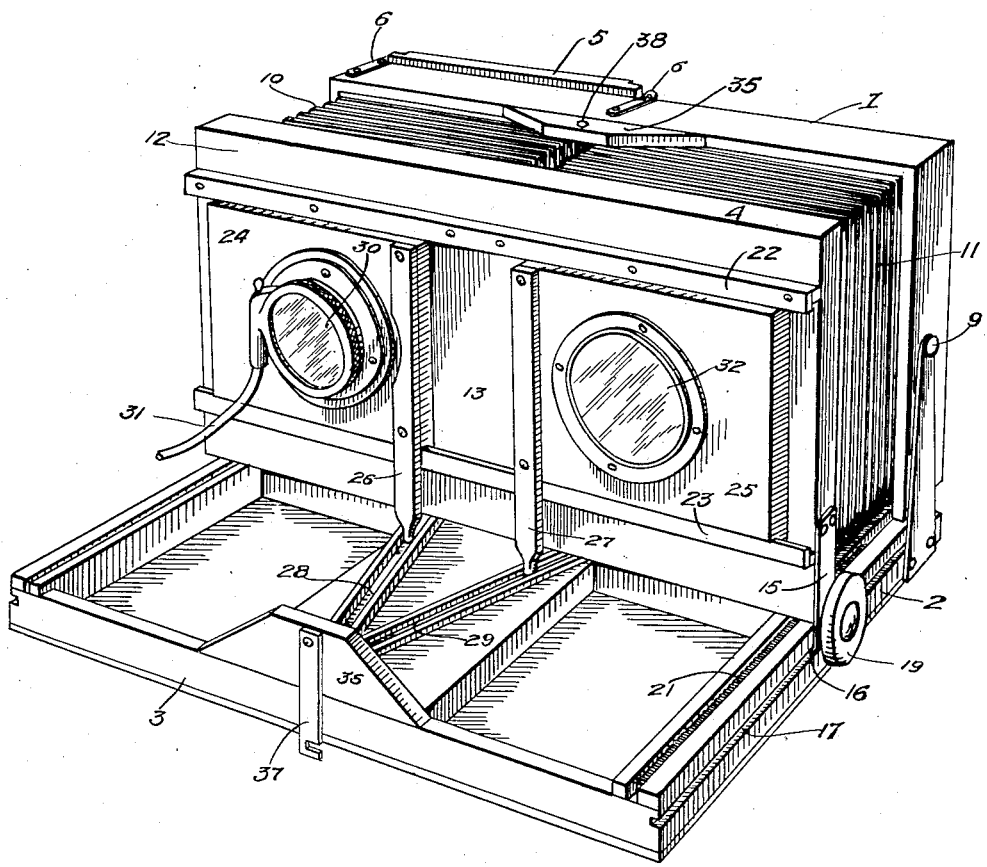
Fig. 1 is a perspective view of the device.

Referring to the several views of the drawings, the device is constructed as a portable unit comprising a box-like structure having a back 1, a bottom or base 2, a cover 3 which is hingedly attached to the front edge of the bottom, and a movable member 4 disposed in parallel relation with the back and adapted to move forwardly and backwardly with respect to the back. The back 1 preferably takes the form of a frame mounted upon the base or bottom without adaptation for movement as a unit and being adapted only for such adjustment as is commonly employed in ordinary cameras. At one side of the rear of the frame, there is provided the usual plate holder 5 into which the usual photographic plate may be readily inserted. The plate holder may be removably attachable to the frame 1 by any suitable means such as the spring finger clips 6 carried by the frame and provided with apertures 7 in their free ends adapted to receive pins 8 carried on the plate holder. The frame may be pivotally mounted on side supports 9 to enable customary adjustment.

A pair of bellows members 10 and 11 extend within the frame 1 and are suitably attached at the rear thereof so as to provide separate light-impervious chambers. Although two bellows members are shown, a single bellows member extending the full width of the device could be used and could be provided with a partition separating the bellows member into separate chambers, the partition being constructed, of course, so as to be collapsible or adjustable in the manner of the bellows member. The bellows member 10 provides a chamber directly in front of the plate holder 5 and is adapted to convey light reflected from the object rearwardly to the photographic plate held by the said holder. The bellows member 11 provides a chamber for the sighting side of the device which conveys light reflected from the object to be photographed rearwardly to the back of frame 1, so that the object may be sighted and the camera focused by looking through the bellows member 11 from the rear of frame 1. The back of the frame on the right-hand side, as viewed in Fig. 1, may be closed by glass suitable for sighting directly through that side of the camera.

The movable member 4 may comprise a frame 12 carrying a wall 13 in which there are provided spaced openings, one of which is shown at 14 in Figs. 4 and 5. The front ends of bellows members 10 and 11 are connected to the wall 13 about the respective openings therein as shown in Fig. 5. Support and guide brackets 15 are carried at the sides of the movable member 4, these brackets having inwardly-turned lower end portions 16 (Fig. 2) slidably seated in grooves or recesses 17 provided along the sides of the base 2 and the cover 3. When the cover is in open position, as shown in Figs. 1 to 3, the complementary portions of recesses 17, provided respectively in the base and cover, are in alignment so that the brackets 15 may slide in the grooves or recesses from the extreme rearward position of member 4 to the extreme forward position of the said member. A transversely-extending shaft or rod 18 is rotatably journaled in brackets 15 and is provided at one end with a hand-wheel 19 by means of which the shaft may be rotated at will. The shaft carries pinions 20 near its ends which mesh with complementary gear-rack sections 21 carried by the base and the cover. When the cover is in open position, as illustrated, the pinions may ride along the aligned gear-rack sections carried respectively by the base and the cover. It will be seen that rotation of shaft 18, through the medium of the hand-wheel 19, will cause the movable member 4 to move forwardly or backwardly with respect to the back or frame 1. During such movement, the bellows members will, of course, expand or contract. It is important to note that the bellows members are adapted for rectilinear movement only and are not required to move transversely at all. This is an important feature, as will be more clearly understood later.

Upper and lower transversely-extending guides or tracks 22 and 23 are provided on the wall 13 of the movable member 4 and are adapted to slidably support lens plates 24 and 25. These lens plates are unattached to any part of the apparatus and are simply slidably seated in the guides or tracks so as to be freely movable transversely of the device. Owing to the free mounting of the lens plates as independent or individual units, there is substantially no frictional resistance to movement and no tendency for the plates to bind in their guides or tracks. There is, therefore, no necessity for the provision of anti-friction devices, such as rollers. At their inner sides, the lens plates carry vertically-extending arms 26 and 27, the lower ends of which are tapered and slidably seated in convergent tracks 28 and 29 carried by the base and cover. The complementary portions of these tracks, which are carried respectively by the base and the cover, are in alignment when the cover is in open position, as illustrated, so that the tapered ends of arms 26 and 27 may ride in the tracks throughout the range of movement of the movable member 4. The convergent portion of tracks 28 and 29, shown clearly in Fig. 1, causes transverse movement of the lens plates toward or away from each other, depending upon the direction of movement of member 4. This provides for proper focusing of both units of the device, as will be well understood from the teachings of the prior art showing devices of this general nature. Owing to the free mounting of the lens plates, there is no necessity for providing anti-friction devices, such as rollers, on the ends of arms 26 and 27. Inasmuch as there is practically no frictional resistance to movement of the freely mounted lens plates, the sliding arrangement of arms 26 and 27 in their respective tracks 28 and 29 is highly satisfactory.

The lens 30, carried by lens plate 24, is of the conventional type employed in studio or portrait cameras, the lens assembly comprising a shutter or diaphragm which is actuatable by conventional means, such as pneumatically-operable mechanism comprising a tube 31, as shown, through which air is forced by a compressible bulb (not shown). It will be understood that the shutter or diaphragm is normally closed and is opened only when the actuating mechanism is operated. The lens 32 carried by lens plate 25 is an ordinary lens having no shutter or other light-obstructing device associated with it. Therefore, the light is free at all times to pass through lens 32 and its associated bellows chamber to the rear of the device. The openings in wall 13 behind the lenses are of such size and shape that the light entering the lenses is not obstructed by wall 13 during any positioning of the lenses throughout the range of transverse movement thereof. When the object is properly posed and the camera properly focused by sighting through lens 32, the picture may be taken immediately by actuating the shutter of lens 30.

It will be seen that the lens plates are simply placed in front of the wall 13 and slid transversely in front of the said wall during focusing of the camera. As the desired object is to enable the posing of the object and the focusing of the camera while the photographic plate is mounted in place in holder 5 and with the shutter or diaphragm of lens 30 closed, it will be seen that it is important that no light pass behind the lens plate 24 into bellows 10, since this would deleteriously affect the photographic plate or even render it useless. In view of the highly sensitive nature of the photographic plates now being used in photographic work, it is essential that no light be allowed to enter the bellows 10. Quite obviously, light would pass behind the lens plate 24, particularly from the sides thereof in the absence of any means to prevent it. In order, therefore, to guard against this and enable the use of freely-mounted lens plates, the structure shown clearly in Fig. 5 is provided and constitutes a very important feature of the invention. In the illustration, the lens plate 24 is removed from its guides or tracks and swung around to expose its rear surface. The wall 13 is provided about the opening 14 therein with a flange structure 33, this structure projecting forwardly from the wall surface. The lens plate 24 is provided with a recess 34 which is adapted to receive the projecting flange. The recess 34 is of such size and shape that the flange 33 may slide within the recess during transverse movement of the lens plate. It will be seen that with this structure provided, the light would have to traverse a tortuous path around the flange 33 to get into the bellows 10. This is impossible, particularly as the passage is crack-like and there can be no reflection of the light. Thus the light is effectively prevented from passing behind the lens plate 24 into the bellows chamber. It will be seen that this arrangement is very simple and yet serves the purpose very efficiently.

The cover 3, when closed, effectively prevents dirt or other foreign matter from getting to the lenses. The upper wall of the back or frame 1 is preferably provided with a forwardly-projecting stop or abutment portion 35 (see Fig. 1) against which the movable member 4 abuts when moved to its extreme rearward position. The cover 3 is provided with a similar portion 36 which is adapted to abut against the movable member 4 when the cover is closed. A latch member 37 is rotatably carried by portion 36 and is adapted to hook over a projecting screw or stud 38 carried by portion 35. This locks the cover in closed position with member 4 securely held by abutment portions 35 and 36, so that the device may be carried about as a compact unit.

The dual unit camera, which is now commonly employed in the trade and which is representative of prior art structures, is provided with a pair of bellows members which are attached at their front portions to transversely-movable lens plates or carriers. This construction prevents light from entering the bellows chambers but it requires that the front portions of the bellows move transversely with the lens carriers. It is, therefore, necessary that the bellows be spaced a substantial distance apart to allow for the transverse movement of their front portions, and for a given overall width of the device, the bellows members are necessarily of substantially smaller transverse dimension than are the bellows members of the constrction proposed by the present invention. Obviously, there is no limit in the present case upon the width of the bellows members other than the overall width of the device. In fact, a single bellows member may be used, as previously stated. The transverse movement of the bellows members is also objectionable in that it imposes a wearing strain or stress upon these members and it causes substantial frictional resistance to the movement of the lens plates which requires the use of anti-friction devices. Quite obviously, the stiffness or resistance to transverse movement of the bellows members necessarily causes the lens plates or carriers to bind against their guides or supports and makes it impossible to use a simple slide arrangement such as that of the present invention. It is also necessary in the case of the transversely-movable bellows to provide anti-friction devices on the mechanism which causes the transverse movement of the lens plates. This is likewise eliminated by this invention.

Although the device is preferably constructed as above described with only one side or unit adapted to actual photographing, it is possible to employ the principles or features of the invention in a device having both sides adapted to the taking of pictures. This, of course, would necessitate the posing of the object and focusing of the camera in the manner of the ordinary single-unit camera which it is sought to avoid. However, the advantage to be derived from the use of two photographic units is that two pictures of the same object may be taken simultaneously. These pictures would be taken from slightly different angles and would, therefore, give slightly different views of the object and there is the further advantage also that the taking of two pictures guards against the possibility of wasted effort due to some unforeseen happening, such as accidental breaking of an exposed plate. Also, the two pictures may be used stereoscopically.

It will be seen from the above description that the invention embodies novel features which mutually contribute toward the provision of a compact, simple and efficient device. Due to the features above described, the device is very easily operated and requires very little effort on the part of the operator. It will be understood, of course, that the device may be modified as to the details thereof without departing from the scope of the invention.

I claim:

1. Apparatus of the class described, comprising a base, front and rear members carried by said base, said front member being movable forwardly and backwardly and having a wall with spaced openings therein, bellows means connecting said members, transverse guide means carried by said wall, a pair of lens plates adjacent said openings slidably carried by said guide means free of attachment to each other or to other parts of the apparatus, whereby said plates are free to move transversely as independent elements, and means for simultaneously moving said front member as a unit and said plates individually.

2. Apparatus of the class described, comprising a base, front and rear members carried by said base, said front member being movable forwardly and backwardly and having a wall with spaced openings therein, bellows means connecting said members, transverse guide means carried by said wall, a pair of lens plates adjacent said openings slidably carried by said guide means free of attachment to each other or to other parts of the apparatus, whereby said plates are free to move transversely as independent elements, and means for simultaneously moving said front member as a unit and said plates individually, said means comprising cooperative elements carried by said base, said front member, and said plates.

3. Apparatus of the class described, comprising a base, front and rear members carried by said base, said front member being movable forwardly and backwardly and having a wall with spaced openings therein, bellows means connecting said members, transverse guide means carried by said wall, a pair of lens plates adjacent said openings slidably carried by said guide means free of attachment to each other or to other parts of the apparatus, whereby said plates are free to move transversely as independent elements, stationary gear racks carried by said base, jointly actuatable pinions carried by said front member and meshing respectively with said racks, convergent tracks carried by said base, and arms carried by said plates slidably engaging said tracks respectively.

4. Apparatus of the class described, comprising a base, front and rear members carried by said base, said front member being movable forwardly and backwardly and having a wall with spaced openings therein, bellows means connecting said members, transverse guide means carried by said wall, a pair of lens plates adjacent said openings slidably carried by said guide means free of attachment to each other or to other parts of the apparatus, whereby said plates are free to move transversely as independent elements, means for preventing entrance of light between said wall and one of said plates, and means for simultaneously moving said front member as a unit and said plates individually.

5. Apparatus of the class described comprising a base, front and rear members carried by said base, said front member being movable forwardly and backwardly and having a wall with spaced openings therein, bellows means connecting said members, upper and lower transversely extending tracks carried by said wall, a pair of lens plates in front of said openings slidably carried by said tracks free of attachment to each other or to other parts of the apparatus, whereby said plates are free to move transversely as independent elements, a projection on the front of said wall about one of said openings, a recess in the rear of the plate adjacent said one opening slidably seating said projection, and means for simultaneously moving said front member as a unit and said plates individually.

6. Apparatus of the class described comprising a base, front and rear members carried by said base, said front member being movable forwardly and backwardly and having a wall with spaced openings therein, bellows means connecting said members, upper and lower transversely extending tracks carried by said wall, a pair of lens plates in front of said openings slidably carried by said tracks free of attachment to each other or to other parts of the apparatus, whereby said plates are free to move transversely as independent elements, a projection on the front of said wall about one of said openings, a recess in the rear of the plate adjacent said one opening slidably seating said projection, stationary gear racks carried by said base, jointly actuatable pinions carried by said front member and meshing respectively with said racks, convergent tracks carried by said base, and arms carried by said plates slidably engaging said tracks respectively.

7. A portable camera, comprising a box-like structure having a back, a bottom, and a front cover hingedly carried at the front edge of said bottom and adapted when open to form a continuation of said bottom, complementary gear rack sections carried by said bottom and said cover, a movable member disposed in parallel relation with said back and having a wall with spaced openings therein, jointly actuatable pinions carried by said member and meshing with said racks, rectilinearly movable bellows connecting said back and said member, upper and lower transversely extending tracks carried by said wall, a pair of lens plates freely mounted in said tracks in front of said openings for transverse sliding movement as independent elements, convergent tracks carried by said cover, and arms carried by said plates slidably engaging said convergent tracks respectively.

8. A portable camera, comprising a box-like structure having a back, a bottom, and a front cover hingedly carried at the front edge of said bottom and adapted when open to form a continuation of said bottom, complementary gear rack sections carried by said bottom and said cover, a movable member disposed in parallel relation with said back and having a wall with spaced openings therein, jointly actuatable pinions carried by said member and meshing with said racks, rectilinearly movable bellows connecting said back and said member, upper and lower transversely extending tracks carried by said wall, a pair of lens plates freely mounted in said tracks in front of said openings for transverse sliding movement as independent elements, a projection on the front of said wall about one of said openings, a recess in the rear of the plate adjacent said one opening slidably seating said projection, convergent tracks carried by said cover, and arms carried by said plates slidably engaging said convergent tracks respectively.

CARL MILLER.